(12) United States Patent
Jiang et al.

(10) Patent No.: US 10,211,961 B2
(45) Date of Patent: Feb. 19, 2019

(54) METHOD AND SYSTEM FOR SENDING TRANSMISSION ACKNOWLEDGEMENT INFORMATION

(71) Applicant: ZTE CORPORATION, Shenzhen, Guangdong Province (JP)

(72) Inventors: Anming Jiang, Shenzhen (CN); Bo Sun, Shenzhen (CN); Nan Li, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 168 days.

(21) Appl. No.: 15/106,319

(22) PCT Filed: Jul. 25, 2014

(86) PCT No.: PCT/CN2014/083090
§ 371 (c)(1),
(2) Date: Jul. 25, 2016

(87) PCT Pub. No.: WO2015/096475
PCT Pub. Date: Jul. 2, 2015

(65) Prior Publication Data
US 2016/0359604 A1   Dec. 8, 2016

(30) Foreign Application Priority Data

Dec. 23, 2013   (CN) .......................... 2013 1 0723855

(51) Int. Cl.
*H04L 5/00* (2006.01)
*H04L 27/26* (2006.01)
(Continued)

(52) U.S. Cl.
CPC .......... *H04L 5/0055* (2013.01); *H04L 1/1854* (2013.01); *H04L 27/2608* (2013.01); *H04L 1/1864* (2013.01); *H04W 84/12* (2013.01)

(58) Field of Classification Search
None
See application file for complete search history.

(56) References Cited

U.S. PATENT DOCUMENTS

| 6,990,343 B2 * | 1/2006 | Lefkowitz ......... H04W 36/0038 370/331 |
| 7,542,472 B1 * | 6/2009 | Gerendai .............. H04L 1/1635 370/338 |

(Continued)

FOREIGN PATENT DOCUMENTS

| CN | 102090011 A | 6/2011 |
| CN | 102948101 A | 2/2013 |
| WO | 2013179270 A1 | 12/2013 |

OTHER PUBLICATIONS

Goyal, S. et al.,"A Distributed MAC Protocol for Full Duplex Radio", www. IEEE.org, forty seventh asilomar conference on signals, Jun. 11, 2013.

*Primary Examiner* — Candal Elpenord
(74) *Attorney, Agent, or Firm* — Ling Wu; Stephen Yang; Ling and Yang Intellectual Property (57) ABSTRACT

A method and system for sending transmission acknowledgement information are disclosed, which relate to the wireless communication field; and solves the problem that full-duplex communication cannot be performed smoothly. The method includes: when a sender completes to send a radio frame to a receiver and needs the receiver to reply transmission acknowledgement information, if the receiver is sending a radio frame to the sender, the receiver replies the transmission acknowledgement information to the sender according to a determined mode for the transmission (Continued)

acknowledgement information. The above technical scheme applies to the WLAN, which achieves a timely data transmission acknowledgement mechanism.

14 Claims, 2 Drawing Sheets

(51) Int. Cl.
*H04L 1/18* (2006.01)
*H04W 84/12* (2009.01)

(56) References Cited

U.S. PATENT DOCUMENTS

| | | | |
|---|---|---|---|
| 9,686,049 B2* | 6/2017 | Fischer | H04L 1/1854 |
| 2009/0252143 A1* | 10/2009 | Sridhara | H04L 1/1685 |
| | | | 370/345 |
| 2010/0220678 A1* | 9/2010 | Wentink | H04W 72/1289 |
| | | | 370/329 |
| 2013/0272226 A1 | 10/2013 | Li | |

\* cited by examiner

METHOD AND SYSTEM FOR SENDING TRANSMISSION ACKNOWLEDGEMENT INFORMATION

TECHNICAL FIELD

The present document relates to the sending technology for transmission acknowledgement information, and specifically, to a method and system for sending transmission acknowledgement information.

BACKGROUND OF THE RELATED ART

At present, in the field of wireless network, Wireless Local Area Network (WLAN) develops rapidly, the demand for WLAN coverage increasingly grows in world wide. Electrical and electronic engineers association industry standard IEEE802.11 working group has defined a series of WLAN technology standards, such as, the 802.11a, 802.11b, 802.11g, and mainly formulates the specifications of physical layer (PHY) and media access control (MAC) layer. Then there have successively appeared the other task groups, committed to the development of the specification for improving the related technology of 802.11 involved, for example, HEW (High Efficiency Wlan) task group mainly studies how to make the WLAN network transmit more efficiently in 2.4/5 GHZ frequency band.

At present, in the study of WLAN, the full-duplex communication (Full Deplex) concept is proposed, by the self-interference elimination technology, it makes the both sides of full-duplex communication send the radio frame to the other party at the same time of receiving the radio frame from the other party. As the both sides of the full-duplex communication receive and send the radio frame at the same time, so the both sides of full-duplex communication is the sender and is also the receiver.

In the related 802.11 technology, after the receiver receives the radio frame transmitted by the sender, and after a short interframe space (SIFs), the receiver replies the transmission acknowledgement information (Acknowledgement, ACK message or Block Acknowledgement, BA message, etc.) to the sender to confirm the radio frame transmitted by the sender to be received correctly. Wherein, the ACK acknowledges a single radio frame, BA acknowledges multiple radio frames.

For full-duplex communication, because the two sides send the radio frame at the same time, so it will appear that, after one side sends the radio frame, the other side is still sending the radio frame, in this case, it can't reply the transmission acknowledgement information after the SIFs as that in the related 802.11 technology, in this case, the sender cannot determine whether the data transmitted by itself is received correctly by the receiver, thus cannot determine the next step is to continue to send the data of next frame or retransmit the data, thus the full-duplex communication cannot be smoothly conduct in accordance with the related technology, so how to reply the transmission acknowledgement information is the problem to be promptly solved in full-duplex communication.

SUMMARY

The technical problem required to be solved in the embodiment of the present document is to provide a method and system for sending transmission acknowledgement information, which solves the problem that full-duplex communication cannot be performed smoothly.

In order to solve the above technical problem, the following technical schemes are used:

a method for sending transmission acknowledgement information, comprising:

determining a mode for a receiver replying transmission acknowledgement information to a sender;

when the sender completes to send a radio frame to the receiver, and needs the receiver to reply transmission acknowledgement information, if the receiver is sending a radio frame to the sender, the receiver replies the transmission acknowledgement information to the sender according to the determined mode for replying the transmission acknowledgement information.

Alternatively, determined modes for replying the transmission acknowledgement information comprises a timely acknowledgement mode and a delayed acknowledgement mode.

Alternatively, when the determined mode for replying the transmission acknowledgement information is the timely acknowledgement mode, the step of the receiver replying the transmission acknowledgement information to the sender according to the determined mode for replying the transmission acknowledgement information comprises:

the receiver sending the transmission acknowledgement information through a currently transmitted radio frame sent by the receiver to the sender.

Alternatively, the step of the receiver sending the transmission acknowledgement information through a currently transmitted radio frame sent by the receiver to the sender comprises:

the receiver sending the transmission acknowledgement information to the sender through making the transmission acknowledgement information contained in one or a plurality of symbols in the currently transmitted radio frame sent to the sender.

Alternatively, the symbol is an OFDM symbol, the step of the receiver sending the transmission acknowledgement information to the sender through making the transmission acknowledgement information contained in one or multiple symbols in the currently transmitted radio frame sent to the sender comprises:

indicating the transmission acknowledgement information through a cyclic prefix part or pilot in the OFDM symbol or other time domain or frequency domain resources in the symbol; or, indicating the transmission acknowledgement information through setting a specific parameter for a part of time domain or frequency domain resources in the OFDM symbol.

Alternatively, when the determined mode for replying the transmission acknowledgement information is the delayed acknowledgement mode, the step of the receiver replying the transmission acknowledgement information to the sender according to the determined mode for replying the transmission acknowledgement information comprises:

the receiver sends the transmission acknowledgement information to the radio frame sent by the sender following an interframe space after transmitting a current radio frame.

Alternatively, the step of the receiver sending the transmission acknowledgement information to the radio frame sent by the sender following an interframe space after transmitting a current radio frame comprises:

the receiver sends the transmission acknowledgement information to the sender through making the transmission acknowledgement information contained in one or a plurality of symbols in the radio frame or a data frame replied by the receiver to the sender following the interframe space after transmitting the current radio frame.

Alternatively, the symbol is an OFDM symbol, the step of the receiver sending the transmission acknowledgement information to the sender through making the transmission acknowledgement information contained in one or a plurality of symbols in the radio frame or a data frame replied by the receiver to the sender following the interframe space after transmitting the current radio frame comprises:

indicating the transmission acknowledgement information through a cyclic prefix part or a pilot in the OFDM symbol or other time domain or frequency domain resources in the symbol; or, indicating the transmission acknowledgement information through setting a specific parameter for a part of time domain or frequency domain resources in the OFDM symbol.

Alternatively, the step of determining a mode for a receiver replying transmission acknowledgement information to a sender comprises:

before the sender completes to send the radio frame to the receiver, the sender and the receiver determines the mode for the receiver replying the transmission acknowledgement information to the sender through a predefining way or negotiating way; or, after the sender determines the mode for the receiver replying the transmission acknowledgement information to the sender, carrying the mode for replying transmission acknowledgement information in the radio frame sent to the receiver.

Alternatively, after the step of the receiver replying the transmission acknowledgement information to the sender according to the determined mode for replying the transmission acknowledgement information, the method further comprises:

the sender receiving the transmission acknowledgement information sent by the receiver, and sending a next radio frame to the receiver after an interframe space, or after completing to send the currently transmitted radio frame to the receiver, sending a next radio frame to the receiver after the interframe space.

Alternatively, the method further comprises:

when the sender completes to send the radio frame to the receiver, and needs the receiver to reply the transmission acknowledgement information, and the receiver is not sending a radio frame to the sender currently, the receiver directly replying the transmission acknowledgement information to the sender after the interframe space of the receiver.

A device at a receiver, comprising: a judging module, a mode determining module for replying transmission acknowledgement information, and a sending module, wherein:

the judging module, is configured to: judge that when a sender completes to send a radio frame to a receiver, and needs the device at the receiver to reply transmission acknowledgement information, if the device at the receiver is sending a radio frame to the sender, inform the sending module to reply the transmission acknowledgement information to the sender;

the mode determining module for replying transmission acknowledgement information, is configured to: determine a mode for transmission acknowledgement information replied by the sending module;

the sending module, is configured to: reply the transmission acknowledgement information to the sender according to the determined mode for replying the transmission acknowledgement information.

Alternatively, the mode for replying transmission acknowledgement information determined by the mode determining module for replying transmission acknowledgement information comprises timely acknowledgement mode and delayed acknowledgement mode.

Alternatively, the mode determining module for replying transmission acknowledgement information is configured to determine the mode for transmission acknowledgement information replied by the sending module in the following way:

before the sender sends the radio frame to the device at the receiver, determining the mode for the receiver replying transmission acknowledgement information to the sender with the sender through a predefining or negotiating way; or, determining the mode for the receiver replying the transmission acknowledgement information to the sender through analyzing the radio frame sent by the sender.

Alternatively, when the mode for replying transmission acknowledgement information determined by the mode determining module for replying transmission acknowledgement information is the timely acknowledgement mode, the sending module is configured to reply the transmission acknowledgement information to the sender according to the determined mode for replying the transmission acknowledgement information in the following way:

sending the transmission acknowledgement information through a currently transmitted radio frame sent by the receiver to the sender.

Alternatively, the sending module is configured to send the transmission acknowledgement information through a currently transmitted radio frame sent by the receiver to the sender in the following way:

sending the transmission acknowledgement information to the sender through making the transmission acknowledgement information contained in one or a plurality of symbols in the currently transmitted radio frame sent to the sender.

Alternatively, the symbol is an OFDM symbol, the sending module is configured to send the transmission acknowledgement information to the sender through making the transmission acknowledgement information contained in one or a plurality of symbols in the currently transmitted radio frame sent to the sender in the following way:

indicating the transmission acknowledgement information through a cyclic prefix part or a pilot in the OFDM symbol or other time domain or frequency domain resources in the symbol; or, indicating the transmission acknowledgement information through setting a specific parameter for a part of time domain or frequency domain resources in the OFDM symbol.

Alternatively, when the mode for replying transmission acknowledgement information determined by the mode determining module for replying transmission acknowledgement information is the delayed acknowledgement mode, the sending module is configured to reply the transmission acknowledgement information to the sender according to the determined mode for replying the transmission acknowledgement information in the following way:

sending the transmission acknowledgement information to the radio frame sent by the sender following an interframe space after transmitting a current radio frame.

Alternatively, the sending module is configured to send the transmission acknowledgement information to the radio frame sent by the sender following an interframe space after transmitting a current radio frame in the following way:

sending the transmission acknowledgement information to the sender through making the transmission acknowledgement information contained in one or a plurality of symbols in the radio frame or a data frame replied by the receiver to the sender following the interframe space after transmitting the current radio frame.

Alternatively, the symbol is an OFDM symbol, the sending module is configured to send the transmission acknowledgement information to the sender through making the transmission acknowledgement information contained in one or a plurality of symbols in the radio frame or a data frame replied by the receiver to the sender following the interframe space after transmitting the current radio frame in the following way:

indicating the transmission acknowledgement information through a cyclic prefix part or a pilot in the OFDM symbol or other time domain or frequency domain resources in the symbol; or, indicating the transmission acknowledgement information through setting a specific parameter for a part of time domain or frequency domain resources in the OFDM symbol.

Alternatively, the judging module, is further configured to: judge that the sender completes to send the radio frame to the receiver, and needs the receiver to reply transmission acknowledgement information, and the device at the receiver does not send the radio frame to the sender currently, inform the sending module to reply the transmission acknowledgement information;

the sending module, is further configured to: directly reply the transmission acknowledgement information to the sender after the interframe space of the device at the receiver.

A system for sending transmission acknowledgement information, comprising: a sender and any one of the device at the receiver as described above;

the sender is configured to: send a radio frame to the device at the receiver.

Alternatively, the sender is further configured to: after determining the mode for the device at the receiver replying transmission acknowledgement information to the sender, carry the mode in the radio frame sent to the device at the receiver.

Alternatively, the sender is further configured to: receive the transmission acknowledgement information sent by the device at the receiver and send a next radio frame to the device at the receiver after an interframe space, or after completing to send the currently transmitted radio frame to the device at the receiver, send a next radio frame to the device at the receiver after the interframe space.

The method and system for transmitting transmission acknowledgement information in the above technical scheme, when a sender completes to send a radio frame to a receiver and needs the receiver to reply transmission acknowledgement information, if the receiver is sending a radio frame to the sender, the receiver replies the transmission acknowledgement information to the sender according to a determined mode for the transmission acknowledgement information. It achieves a timely data transmission acknowledgement mechanism, which solves the problem that full-duplex communication cannot be performed smoothly.

PREFERRED EMBODIMENTS

For full-duplex communication, because the two sides send the radio frames at the same time, so it will appear that, after a side completes to send the radio frame, the other side is still sending the radio frame, in this case, it can't reply the transmission acknowledgement information after the SIFs as that in the 802.11 technology, in this case, the sender cannot determine whether the data transmitted by itself is received correctly by the receiver, thus cannot determine the next step is to continue to send the data of next frame or conduct the data retransmission, so the full-duplex communication cannot be smoothly conduct in accordance with the related technology, so how to reply the transmission acknowledgement information is the problem to be promptly solved in full-duplex communication.

In order to solve the above technical problem, a method and system for sending transmission acknowledgement information is provided by the embodiment of the present document, the mode for replying the transmission acknowledgement information by the receiver to the sender determined in advance is timely acknowledgement mode or delayed acknowledgement mode; when the sender completes to send a radio frame to a receiver and needs the receiver to reply transmission acknowledgement information, if the receiver is sending the radio frame to the sender, the receiver replies the transmission acknowledgement information to the sender according to a mode for the transmission acknowledgement information determined in advance, which provides a sending mechanism for the transmission acknowledgement information.

The embodiments of the present document will be described in detail in combination with the accompanying drawings below. It should be noted that the embodiments in the present application and the characteristics in the embodiments can be arbitrarily combined with each other in the case of no conflict.

A method for sending transmission acknowledgement information, comprises that:

when the sender completes to send a radio frame to the receiver, and needs the receiver to reply transmission acknowledgement information, if the receiver is sending the radio frame to the sender, the receiver replies the timely acknowledgement information or the delayed acknowledgement information which carries the transmission acknowledgement information to the sender.

Alternatively, the timely acknowledgement information is sent through a currently transmitted radio frame sent by the receiver to the sender.

Alternatively, the delayed acknowledgement information is sent through the receiver replying the radio frame to the sender following an interframe space after transmitting a current radio frame, the delayed acknowledgement information is ACK or BA or the transmission acknowledgement information that carries in the other radio frame.

Alternatively, the method further comprises that:

before the full-duplex communication, the sender and the receiver determine sending the transmission acknowledgement information by the timely acknowledgement information or the delayed acknowledgement information through a predefining way or negotiating way.

Alternatively, the method further comprises that:

the sender indicates the receiver to reply the timely acknowledgement information or the delayed acknowledgement information in the radio frame sent to the receiver.

Alternatively, the timely acknowledgement information is sent after the receiver receives the radio frame sent by the sender.

Alternatively, the transmission acknowledgement information is contained in one or multiple symbols in the currently transmitted radio frame.

Alternatively, the symbol is the OFDM symbol, the transmission acknowledgement information is indicated through a cyclic prefix part or a pilot in the OFDM symbol or other time domain or frequency domain resources in the symbol.

Alternatively, the time domain or frequency domain resources used by the OFDM symbol is different from the corresponding resources in other OFDM symbol, the transmission acknowledgement information is indicated through setting a specific parameter for the time domain or frequency domain resources.

Alternatively, the transmission acknowledgement information is used to inform the sender that the radio frame sent by the sender is received correctly, or inform the sender that the radio frame sent by the sender needs to be retransmitted, the transmission acknowledgement information is ACK information or BA information.

Alternatively, after the step of the receiver replies the timely acknowledgement information or the delayed acknowledgement information which carries the transmission acknowledgement information to the sender, the method further comprises that:

the sender receives the transmission acknowledgement information sent by the receiver, and sends a next radio frame to the receiver after an interframe space, or after completing to send the currently transmitted radio frame to the receiver, sends a next radio frame to the receiver after the interframe space.

Alternatively, the method further comprises:

when the sender completes to send the radio frame to the receiver, and needs the receiver to reply transmission acknowledgement information, and the receiver is not sending a radio frame to the sender currently, the receiver replies the transmission acknowledgement information to the sender after the interframe space.

Alternatively, the interframe space is the short interframe space or full-duplex interframe space or none of space.

The present document further provides a system for sending transmission acknowledgement information, comprising: a sender and a receiver;

the receiver is used to: when the sender completes to send a radio frame to the receiver, and needs the receiver to reply transmission acknowledgement information, and the receiver is sending the radio frame to the sender, reply the timely acknowledgement information or the delayed acknowledgement information which carries the transmission acknowledgement information to the sender.

Alternatively, when the receiver is sending the timely acknowledgement information, the timely acknowledgement information is specifically sent through a currently transmitted radio frame sent by the receiver to the sender.

Alternatively, when the receiver is sending the delayed acknowledgement information, the delayed acknowledgement information is specifically sent through the receiver replying the radio frame or data frame to the sender following an interframe space after transmitting a current radio frame, the delayed acknowledgement information is ACK or BA or the transmission acknowledgement information that is carried in the other radio frame.

Alternatively, the sender is used to indicate the receiver to reply the timely acknowledgement information or the delayed acknowledgement information in the radio frame sent to the receiver.

Alternatively, the sender is further used to receive the transmission acknowledgement information sent by the receiver, and send a next radio frame to the receiver after an interframe space, or after completing to send the currently transmitted radio frame to the receiver, send a next radio frame to the receiver after the interframe space.

Alternatively, the receiver is further used to: when the sender completes to send the radio frame to the receiver, and needs the receiver to reply transmission acknowledgement information, and the receiver is not sending a radio frame to the sender currently, reply the transmission acknowledgement information to the sender after the interframe space.

Embodiment 1

The present document provides a method for sending transmission acknowledgement information, uses STA1 to be a sender, and uses STA2 to be a receiver as an example to illustrate.

The STA1 and STA2 perform the full-duplex communication. The STA1 sends radio frame 1 to the STA2, the STA2 sends radio frame 2 to the STA1, wherein, the radio frame 1 contains the information to indicate the STA2 to reply the timely acknowledgement information, the radio frame 2 contains the information to indicate the STA1 to reply the delayed acknowledgement information, after the STA1 completes to send the radio frame 1 to the STA2, it waits the STA2 to reply the transmission acknowledgement information. At this time, the STA2 is receiving the radio frame 1 correctly and still continues transmitting the radio frame 2 at the same time, then the STA2 carries the transmission acknowledgement information 1 in a subsequent OFDM symbol in the radio frame 2 sent in the following to tell the STA1 that the radio frame 1 is received correctly, the transmission acknowledgement information 1 indicates by performing a phase rotation on the pilots in the subsequent OFDM symbol. The STA1 receives the ACK information and begins the transmission of the radio frame 3 after the interframe space, after transmitting the radio frame 3, the STA1 sends the transmission acknowledgement information 2 to the STA2 after the interframe space.

Embodiment 2

The present document provides a method for sending transmission acknowledgement information, uses STA1 to be a sender, and uses STA2 to be a receiver as an example to illustrate.

The STA1 and STA2 perform the full-duplex communication. Before the full-duplex communication, it is to negotiate to use the timely acknowledgement information by frame switch sequence, the STA1 sends the radio frame 1 to STA2, the STA2 sends the radio frame 2 to the STA1. After the STA1 completes to send the radio frame 1 to the STA2, continues to send the radio frame 3. The STA2 has not received the radio frame 1, thereby the radio frame 2 has no transmission acknowledgement information, the STA1 retransmits the radio frame 1 after sending out the radio frame 3.

Embodiment 3

The present document provides a method for sending transmission acknowledgement information, uses STA1 to be a sender, and uses STA2 to be a receiver as an example to illustrate.

The STA1 and STA2 perform the full-duplex communication. Before the full-duplex communication, it is to negotiate to use the timely acknowledgement information by frame switch sequence, the STA1 sends the radio frame 1 to the STA2, the STA2 sends the radio frame 2 to the STA1. After STA1 completes to send the radio frame 1 to the STA2, continues to send the radio frame 3. At this time, the STA2 has still continued to transmit the radio frame 2 after correctly received the radio frame 1 and the radio frame 3, the STA2 carries the transmission acknowledgement information 1 and the transmission acknowledgement information 2 in two OFDM symbols of the radio frame 2 sent in the following, and tells STA1 that whether the radio frame 1 and the radio frame 3 need to be retransmitted, the transmission acknowledgement information carried by each above OFDM symbol corresponds to one radio frame sent by STA1. The transmission acknowledgement information 1 indicates by changing the part of cyclic prefix in OFDM symbol to specific sequence. The above OFDM symbols are predefined specific symbols, that is, the STA2 knows the difference between the part of cyclic prefix in OFDM symbol and other OFDM symbols in advance, the part of cyclic prefix indicates the transmission acknowledgement information especially with the specific information.

Embodiment 4

The present document provides a method for sending transmission acknowledgement information, uses STA1 to be a sender, and uses STA2 to be a receiver as an example to illustrate.

The STA1 and STA2 perform the full-duplex communication. The AP informs all the sites to reply the delayed acknowledgement information by broadcasting radio frames. The STA1 sends the radio frame 1 to the STA2, the STA2 sends the radio frame 2 to the STA1, after the STA1 completes to send the radio frame 1 to the STA2, at this time, the STA2 has still continued to transmit the radio frame 2 at the meanwhile that has correctly received the radio frame 1, then, the STA1 waits the STA2 to reply the delayed acknowledgement information in accordance with the instruction indicated by the AP before. After completing to send the radio frame 2, replying the delayed acknowledgement information after an interframe space to tell the STA1 that the radio frame 1 needs to be retransmitted, the STA1 retransmits the radio frame 1 following the interframe space after receiving the delayed acknowledgement information.

Embodiment 5

The present document provides a method for sending transmission acknowledgement information, uses STA1 to be a sender, and uses STA2 to be a receiver as an example to illustrate.

The STA1 and STA2 perform the full-duplex communication. The STA1 and STA2 negotiated to reply the timely acknowledgement information. The STA1 sends the radio frame 1 to the STA2, the STA2 sends the radio frame 2 to the STA1. After STA1 completes to send the radio frame 1 to the STA2, at this time, the STA2 has still continued to transmit the radio frame 2, at the meanwhile that has correctly received the radio frame 1, then, the STA1 waits the STA2 to reply the timely acknowledgement information in accordance with the negotiation before, then, the STA2 carries the transmission acknowledgement information 1 in one or multiple subsequent OFDM symbols of the radio frame 2 sent in the following, and tells STA1 that the radio frame 1 needs to be retransmitted, the transmission acknowledgement information 1 is carried by pilots in one or multiple subsequent OFDM symbols. The STA1 receives the timely acknowledgement information and retransmits the radio frame 1 after the interframe space after receiving.

Embodiment 6

The present document provides a method for sending transmission acknowledgement information, uses STA1 to be a sender, and uses STA2 to be a receiver as an example to illustrate.

The STA1 and STA2 perform the full-duplex communication. The STA1 sends the radio frame 1 to the STA2, the STA2 sends the radio frame 2 to the STA1, after the STA1 completes to send the radio frame 1 to the STA2, at this time, the STA2 has correctly received the radio frame 1, and at meanwhile, it has still continued to transmit the radio frame 2 at the meanwhile, the STA1 waits the STA2 to reply the timely acknowledgement information in accordance with the predefining, then, the STA2 carries the transmission acknowledgement information 1 in one or multiple subsequent OFDM symbols of the radio frame 2 sent in the following, and tells STA1 that the radio frame 1 has been received correctly, the STA1 receives the transmission acknowledgement information 1, and starts to transmit the radio frame 3 after an interframe space, the transmission acknowledgement information 1 indicates by changing the part of cyclic prefix in OFDM symbol to specific sequence. The above OFDM symbols are predefined specific symbols, that is, the STA2 knows the difference between the part of cyclic prefix in the OFDM symbol and other OFDM symbols in advance, the part of cyclic prefix indicates the transmission acknowledgement information especially with the specific information.

Embodiment 7

The present document provides a method for sending transmission acknowledgement information, uses STA1 to be a sender, and uses STA2 to be a receiver as an example to illustrate.

The STA1 and STA2 perform the full-duplex communication. The STA1 sends the radio frame 1 to the STA2, the STA2 sends the radio frame 2 to the STA1, after the STA1 completes to send the radio frame 1 to the STA2, at this time, the STA2 has correctly received the radio frame 1, and at the meanwhile, it has still continued to transmit the radio frame 2, the STA1 waits the STA2 to reply the timely acknowledgement information in accordance with the predefining. In the radio frame 2, the control information or the transmission acknowledgement information is indicated by inserting the special OFDM symbol in the fixed symbol interval, the STA1 judges that weather the sent radio frame 1 has been received correctly according to the special OFDM symbol in the radio frame 2.

Embodiment 8

Figure 1:
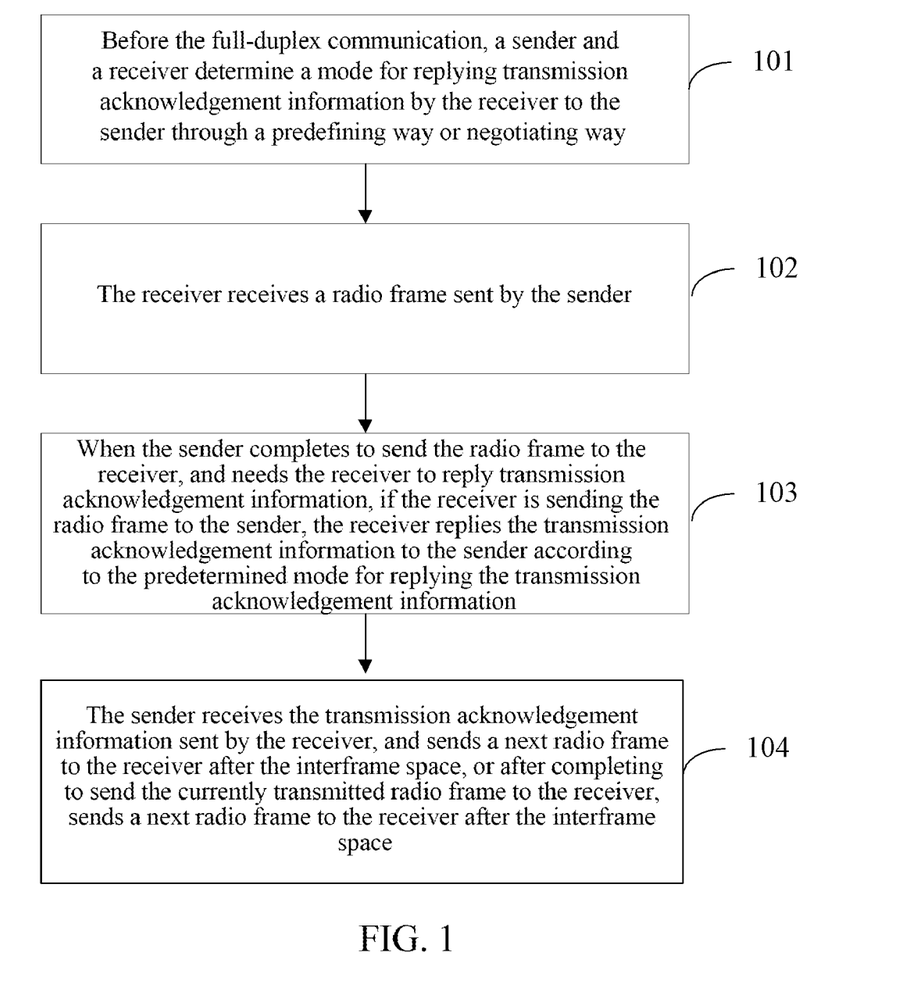
FIG. 1 is a flow chart of a method for transmitting transmission acknowledgement information of the embodiment of the present document.

The present document provides a method for sending transmission acknowledgement information, using the method to complete the process for sending transmission acknowledgement information, as shown in FIG. 1, comprising the following steps.

The step 101, before the full-duplex communication, the sender and the receiver determine the mode for sending the transmission acknowledgement information by the receiver to the sender through a predefining or negotiating way;

alternatively, the determined mode for replying the transmission acknowledgement information is the timely acknowledgement mode or the delayed acknowledgement mode.

In the present step, the timely acknowledgement mode is the mode of sending the transmission acknowledgement information immediately after completing the receiving, the delayed acknowledgement mode is the mode of sending the transmission acknowledgement information in a period of time after completing the receiving.

The sender carries the mode for replying the transmission acknowledgement information in the radio frame sent to the receiver, indicates the receiver to send the transmission acknowledgement information immediately after completing the receiving, or send the transmission acknowledgement information in a period of time after completing the receiving.

The transmission acknowledgement information is used to inform the sender that the radio frame sent by itself is received correctly, or inform the sender that the radio frame sent by itself needs to be retransmitted, the transmission acknowledgement information is ACK information or BA information.

In step 102, the receiver receives the radio frame sent by the sender;

in the present step, the receiver receives the radio frame sent by the sender, that is triggering the process of sending the transmission acknowledgement information to the sender.

In step 103, when the sender completes to send the radio frame to the receiver, and needs the receiver to reply transmission acknowledgement information, if the receiver is sending the radio frame to the sender, the receiver replies the transmission acknowledgement information to the sender according to the determined mode for replying the transmission acknowledgement information;

in the present step, it is specifically that:

1. when the mode for replying the transmission acknowledgement information by the receiver to the sender is the timely acknowledgement mode:

the transmission acknowledgement information is ACK information or BA information or the transmission acknowledgement information carried in other radio frames except the radio frame is being sent by the receiver to the sender.

the transmission acknowledgement information is sent through the currently transmitted radio frame sent by the receiver to the sender.

the transmission acknowledgement information is sent after the receiver receiving the radio frame sent by the sender.

the transmission acknowledgement information is contained in one or multiple symbols in the currently transmitted radio frame.

The symbol is the OFDM symbol, which indicates the transmission acknowledgement information through a cyclic prefix part or a pilot in the OFDM symbol or other time domain or frequency domain resources in the symbol; or, indicates the transmission acknowledgement information through setting a specific parameter for a part of time domain or frequency domain resources in the OFDM symbol.

2. When the mode for replying the transmission acknowledgement information by the receiver to the sender is the delayed acknowledgement mode:

the transmission acknowledgement information is ACK information or BA information or the transmission acknowledgement information carried in other radio frames except the radio frame is being sent by the receiver to the sender.

The transmission acknowledgement information is sent through the receiver replying the radio frame or data frame to the sender after the receiver transmits the interframe space of the current radio frame.

The transmission acknowledgement information is contained in one or multiple symbols in the radio frame or data frame replied by the receiver to the sender following the interframe space after transmitting the current radio frame.

The symbol is the OFDM symbol, which indicates the transmission acknowledgement information through a cyclic prefix part or a pilot in the OFDM symbol or other time domain or frequency domain resources in the symbol; or, indicates the transmission acknowledgement information through setting a specific parameter for a part of time domain or frequency domain resources in the OFDM symbol.

Alternatively, the method further comprises: when the sender completes to send the radio frame to the receiver, and needs the receiver to reply transmission acknowledgement information, and the receiver is not sending the radio frame to the sender currently, the receiver replies the transmission acknowledgement information to the sender after the interframe space.

In step 104, the sender receives the transmission acknowledgement information sent by the receiver, and sends a next radio frame to the receiver after the interframe space, or after completing to send the currently transmitted radio frame to the receiver, sends the next radio frame to the receiver after the interframe space.

Alternatively, the interframe space is the short interframe space or full-duplex interframe space or none of space.

Figure 2:
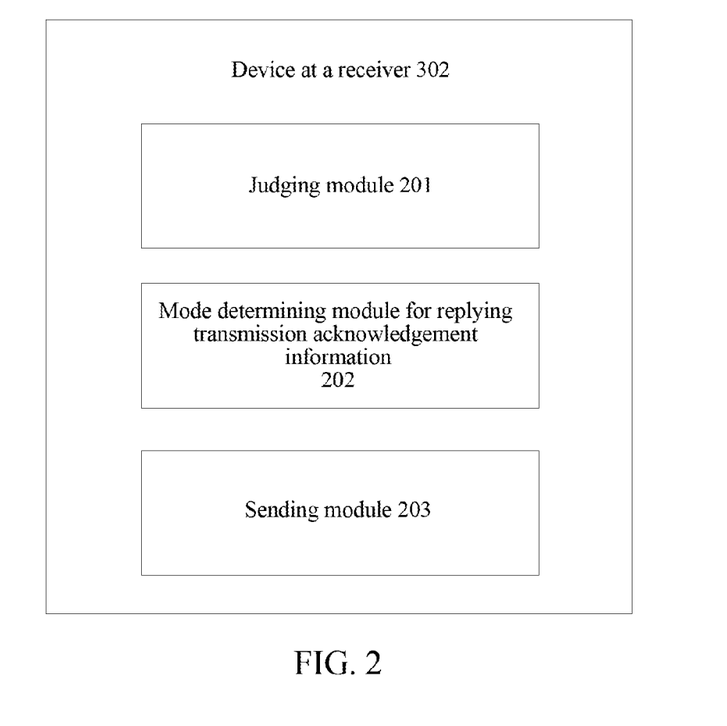
FIG. 2 is a structural schematic chart of a device at a receiver of the embodiment of the present document.

The embodiment of the present document further provides a device at a receiver 302, as shown in FIG. 2, comprising: a judging module 201, a mode determining module for replying transmission acknowledgement information 202, and a sending module 203, wherein:

the judging module 201, is configured to: judge that when a sender completes to send a radio frame to a receiver, and needs the device at the receiver to reply transmission acknowledgement information, if the device at the receiver is sending the radio frame to the sender, inform the sending module 203 to reply the transmission acknowledgement information to the sender;

the mode determining module for replying transmission acknowledgement information 202, is configured to: determine a mode for transmission acknowledgement information replied by the sending module 203;

the sending module 203, is configured to: reply the transmission acknowledgement information to the sender according to the determined mode for replying the transmission acknowledgement information.

Alternatively, the mode for replying transmission acknowledgement information determined by the mode determining module for replying transmission acknowledgement information 202 comprises a timely acknowledgement mode and a delayed acknowledgement mode.

Alternatively, the mode determining module for replying transmission acknowledgement information 202 is configured to determine the mode for transmission acknowledgement information replied by the sending module 203 in the following way:

before the sender completes to send the radio frame to the device at the receiver, determining the mode for the receiver replies transmission acknowledgement information to the sender through a predefining or negotiating way with the sender; or, determining the mode for the receiver replying transmission acknowledgement information to the sender through analyzing the radio frame sent by the sender.

Alternatively, when the mode for replying transmission acknowledgement information determined by the mode determining module for replying transmission acknowledgement information 202 is the timely acknowledgement mode, the sending module 203 is configured to reply the transmission acknowledgement information to the sender according to the determined mode for replying the transmission acknowledgement information in the following way:

sending the transmission acknowledgement information through a currently transmitted radio frame sent by the receiver to the sender.

Alternatively, the sending module 203 is configured to send the transmission acknowledgement information through a currently transmitted radio frame sent by the receiver to the sender in the following way:

sending the transmission acknowledgement information to the sender through making the transmission acknowledgement information contained in one or multiple symbols in the currently transmitted radio frame sent to the sender.

Alternatively, the symbol is the OFDM symbol, the sending module 203 is configured to send the transmission acknowledgement information to the sender through making the transmission acknowledgement information contained in one or multiple symbols in the currently transmitted radio frame sent to the sender in the following way:

indicating the transmission acknowledgement information through a cyclic prefix part or a pilot in the OFDM symbol or other time domain or frequency domain resources in the symbol; or, indicating the transmission acknowledgement information through setting a specific parameter for a part of time domain or frequency domain resources in the OFDM symbol.

Alternatively, when the mode for replying transmission acknowledgement information determined by the mode determining module for replying transmission acknowledgement information 202 is the delayed acknowledgement mode, the sending module 203 is configured to reply the transmission acknowledgement information to the sender according to the determined mode for replying the transmission acknowledgement information in the following way:

sending the transmission acknowledgement information to the radio frame sent by the sender following an interframe space after transmitting a current radio frame.

Alternatively, the sending module 203 is configured to send the transmission acknowledgement information to the radio frame sent by the sender following an interframe space after transmitting a current radio frame in the following way:

sending the transmission acknowledgement information to the sender through making the transmission acknowledgement information contained in one or multiple symbols in the radio frame or data frame replied by the receiver to the sender following the interframe space after transmitting the current radio frame.

Alternatively, the symbol is the OFDM symbol, the sending module 203 is configured to send the transmission acknowledgement information to the sender through making the transmission acknowledgement information contained in one or multiple symbols in the radio frame or data frame replied by the receiver to the sender following the interframe space after transmitting the current radio frame in the following way:

indicating the transmission acknowledgement information through a cyclic prefix part or a pilot in the OFDM symbol or other time domain or frequency domain resources in the symbol; or, indicating the transmission acknowledgement information through setting a specific parameter for a part of time domain or frequency domain resources in the OFDM symbol.

Alternatively, the judging module 201, is further configured to: judge that the sender completes to send the radio frame to the receiver, and needs the receiver to reply transmission acknowledgement information, and the device at the receiver is not sending the radio frame to the sender currently, inform the sending module 203 to reply the transmission acknowledgement information;

the sending module 203, is further configured to: directly reply the transmission acknowledgement information to the sender after the interframe space of the device at the receiver.

Figure 3:
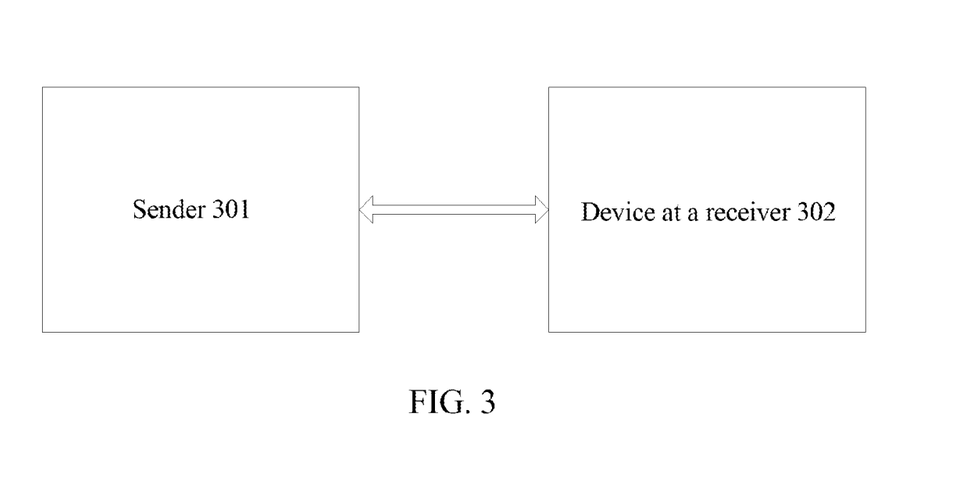
FIG. 3 is a structural schematic chart of a system for sending transmission acknowledgement information of the embodiment of the present document.

The embodiment of the present document further provides a system for sending transmission acknowledgement information, the structure of the system is shown as in FIG. 3, comprising: a sender 301 and a device at a receiver 302 of any one of the above:

the sender 301 is configured to: send a radio frame to the device at the receiver.

Alternatively, the sender 301 is further configured to: after determining the mode for the device at the receiver replies transmission acknowledgement information to the sender, carry the mode in the radio frame sent to the device at the receiver.

Alternatively, the sender 301 is further configured to: receive the transmission acknowledgement information sent by the device at the receiver, and send a next radio frame to the device at the receiver after the interframe space, or after completing to send the currently transmitted radio frame to the device at the receiver, send the next radio frame to the device at the receiver after the interframe space.

The method and system for sending transmission acknowledgement information provided by the embodiment of the present document, when a sender completes to send a radio frame to a receiver and needs the receiver to reply transmission acknowledgement information, if the receiver is sending the radio frame to the sender, the receiver replies the transmission acknowledgement information to the sender according to a determined mode. It achieves a timely data transmission acknowledgement mechanism, which solves the problem that full-duplex communication cannot be performed smoothly.

By using the technical scheme provided by the embodiment of the present document, it is to ensure to complete the corresponding functions at the same time, when the receiver transmits the timely acknowledgement information, it can make the sender to quickly judge whether to retransmit or conduct to send the next frame, and improve the efficiency; when the receiver transmits the delayed acknowledgement information, the complexity of the data processing is relatively low. In the actual full-duplex communication, it can choose which kind of mode to send the transmission acknowledgement information according to the actual situation.

The ordinary person skilled in the art can understand that all or part of the steps in the above embodiments can be implemented by a process of the computer program, the computer program can be stored in a computer readable memory medium, the computer program is implemented on a platform of hardware (for example, system, device, equipment, component and etc.), when it is implemented, it comprises one of the steps or the combination of the methods of the embodiments.

Alternatively, all or part of the steps of the above embodiments also can be implemented by using integrated circuits, these steps can be respectively made into the integrated circuit module one by one, or made multiple modules or steps of them into a single integrated circuit module to be implemented. In this way, the present document is not limited to any specific combination of hardware and software.

Each device/functional module/functional unit in the above embodiments can be implemented by using a general computing device, they can be integrated in a single computing device, can also be distributed in the network consisting of multiple computing devices.

When each device/functional module/functional unit in the above embodiments is implemented by a form of the software functional module and is sold or used as an independent product, they can be stored in a computer readable memory medium. The computer readable memory medium mentioned above can be a read-only memory, disk or optical disk and so on.

Any skilled familiar to the art can easily think of the changes or substitutions in the technical scope of the present document disclosed, and it should be all covered within the protection scope of the present document. Therefore, the protection scope of the present document should take the protection scope of the claims as the criterion.

INDUSTRIAL APPLICABILITY

In the method and system for sending transmission acknowledgement information in the above technical scheme, when a sender completes to send a radio frame to a receiver and needs the receiver to reply transmission acknowledgement information, if the receiver is sending the radio frame to the sender, the receiver replies the transmission acknowledgement information to the sender according to a determined mode for the transmission acknowledgement information. It achieves a timely data transmission acknowledgement mechanism, which solves the problem that full-duplex communication cannot be performed smoothly. Thereby, the present document has relatively strong industrial applicability.

What is claimed is:

1. A method for sending transmission acknowledgement information, comprising:
   determining a mode for a receiver replying transmission acknowledgement information to a sender as a timely acknowledgement mode or a delayed acknowledgement mode;
   when the sender completes to send a radio frame to the receiver and needs the receiver to reply transmission acknowledgement information, the receiver sending a radio frame to the sender while replying the transmission acknowledgement information to the sender according to the determined mode for replying the transmission acknowledgement information;
   wherein when the determined mode for replying the transmission acknowledgement information is the timely acknowledgement mode, the step of the receiver replying the transmission acknowledgement information to the sender according to the determined mode for replying the transmission acknowledgement information comprises:
   the receiver sending the transmission acknowledgement information to the sender through making the transmission acknowledgement information contained in one or a plurality of symbols in the currently transmitted radio frame sent to the sender,
   the symbol is an OFDM symbol;
   the step of the receiver sending the transmission acknowledgement information to the sender through making the transmission acknowledgement information contained in the one or the plurality of symbols in the currently transmitted radio frame sent to the sender comprises:
   indicating the transmission acknowledgement information by changing a cyclic prefix part in the OFDM symbol.

2. The method for sending transmission acknowledgement information according to claim 1, wherein, when the determined mode for replying the transmission acknowledgement information is the delayed acknowledgement mode, the step of the receiver replying the transmission acknowledgement information to the sender according to the determined mode for replying the transmission acknowledgement information comprises:
   the receiver sending the transmission acknowledgement information to the radio frame sent by the sender following an interframe space after transmitting a current radio frame.

3. The method for sending transmission acknowledgement information according to claim 2, wherein, the step of the receiver sending the transmission acknowledgement information to the radio frame sent by the sender following an interframe space after transmitting a current radio frame comprises:
   the receiver sending the transmission acknowledgement information to the sender through making the transmission acknowledgement information contained in the one or the plurality of symbols in the radio frame or a data frame replied by the receiver to the sender following the interframe space after transmitting the current radio frame,
   the step of the receiver sending the transmission acknowledgement information to the sender through making the transmission acknowledgement information contained in one or a plurality of symbols in the radio frame or a data frame replied by the receiver to the sender following the interframe space after transmitting the current radio frame comprises:
   indicating the transmission acknowledgement information through the cyclic prefix part or a pilot in the OFDM symbol or other time domain or frequency domain resources in the symbol; or,
   indicating the transmission acknowledgement information through setting a specific parameter for a part of time domain or frequency domain resources in the OFDM symbol.

4. The method for sending transmission acknowledgement information according to claim 1, wherein, the step of determining a mode for a receiver replying transmission acknowledgement information to a sender comprises:
   before the sender completes to send the radio frame to the receiver, the sender and the receiver determining the mode for the receiver replying transmission acknowledgement information to the sender through a predefining way or negotiating way; or,
   after the sender determines the mode for the receiver replying transmission acknowledgement information to the sender, carrying the mode for replying transmission acknowledgement information in the radio frame sent to the receiver.

5. The method for sending transmission acknowledgement information according to claim 1, after the step of the receiver replying the transmission acknowledgement information to the sender according to the determined mode for replying the transmission acknowledgement information, the method further comprises:
the sender receiving the transmission acknowledgement information sent by the receiver, and sending a next radio frame to the receiver after an interframe space,
or after completing to send a currently transmitted radio frame to the receiver, sending a next radio frame to the receiver after the interframe space.

6. The method for sending transmission acknowledgement information according to claim 1, the method further comprises:
when the sender completes to send the radio frame to the receiver, and needs the receiver to reply transmission acknowledgement information, and the receiver is not sending a radio frame to the sender currently, the receiver directly replying the transmission acknowledgement information to the sender following an interframe space after receiving the radio frame sent by the sender.

7. A device at a receiver, comprising: a judging module, a mode determining module for replying transmission acknowledgement information, and a sending module, wherein:
the judging module is configured to: judge that when a sender completes to send a radio frame to a receiver and needs the device at the receiver to reply transmission acknowledgement information, inform the sending module to reply the transmission acknowledgement information to the sender;
the mode determining module for replying transmission acknowledgement information is configured to: determine a mode for transmission acknowledgement information replied by the sending module as a timely acknowledgement mode or a delayed acknowledgement mode;
the sending module is configured to: reply the transmission acknowledgement information to the sender according to the determined mode for replying the transmission acknowledgement information while sending a radio frame to the sender;
wherein when the determined mode for replying the transmission acknowledgement information is the timely acknowledgement mode, the sending module replying the transmission acknowledgement information to the sender according to the determined mode for replying the transmission acknowledgement information comprises:
the sending module sending the transmission acknowledgement information to the sender through making the transmission acknowledgement information contained in one or a plurality of symbols in the currently transmitted radio frame sent to the sender,
the sending module sending the transmission acknowledgement information to the sender through making the transmission acknowledgement information contained in the one or the plurality of symbols in the currently transmitted radio frame sent to the sender comprises:
indicating the transmission acknowledgement information by changing a cyclic prefix part in the OFDM symbol.

8. The device at the receiver according to claim 7, wherein, the mode determining module for replying transmission acknowledgement information is configured to determine the mode for transmission acknowledgement information replied by the sending module in the following way:
before the sender sends the radio frame to the device at the receiver, determining the mode for the receiver replying transmission acknowledgement information to the sender with the sender through a predefining way or negotiating way; or,
determining the mode for the receiver replying transmission acknowledgement information to the sender through analyzing the radio frame sent by the sender.

9. The device at the receiver according to claim 7, wherein, when the mode for replying transmission acknowledgement information determined by the mode determining module for replying transmission acknowledgement information is the delayed acknowledgement mode, the sending module is configured to reply the transmission acknowledgement information to the sender according to the determined mode for replying the transmission acknowledgement information in the following way:
sending the transmission acknowledgement information to the radio frame sent by the sender following an interframe space after transmitting a current radio frame.

10. The device at the receiver according to claim 9, wherein, the sending module is configured to send the transmission acknowledgement information to the radio frame sent by the sender following an interframe space after transmitting a current radio frame in the following way:
sending the transmission acknowledgement information to the sender through making the transmission acknowledgement information contained in the one or the plurality of symbols in the radio frame or a data frame replied by the receiver to the sender following the interframe space after transmitting the current radio frame,
the sending module is configured to send the transmission acknowledgement information to the sender through making the transmission acknowledgement information contained in the one or the plurality of symbols in the radio frame or a data frame replied by the receiver to the sender following the interframe space after transmitting the current radio frame in the following way:
indicating the transmission acknowledgement information through the cyclic prefix part or a pilot in the OFDM symbol or other time domain or frequency domain resources in the symbol; or,
indicating the transmission acknowledgement information through setting a specific parameter for a part of time domain or frequency domain resources in the OFDM symbol.

11. The device at the receiver according to claim 7, wherein:
the judging module is further configured to: judge that the sender completes to send the radio frame to the receiver, and needs the receiver to reply transmission acknowledgement information, and the device at the receiver is not sending a radio frame to the sender currently, inform the sending module to reply the transmission acknowledgement information;
the sending module is further configured to: directly reply the transmission acknowledgement information to the sender after the interframe space of the device at the receiver.

12. A system for sending transmission acknowledgement information, comprising: a sender and a device at a receiver of claim 7;
   the sender is configured to: send a radio frame to the device at the receiver.

13. The system for sending transmission acknowledgement information according to claim 12, wherein:
   the sender is further configured to: after determining a mode for the device at the receiver replying transmission acknowledgement information to the sender, carry the mode in the radio frame sent to the device at the receiver.

14. The system for sending transmission acknowledgement information according to claim 12, wherein:
   the sender is further configured to: receive the transmission acknowledgement information sent by the device at the receiver, and send a next radio frame to the device at the receiver after an interframe space, or
   after completing to send the currently transmitted radio frame to the device at the receiver, send a next radio frame to the device at the receiver after the interframe space.

* * * * *